(No Model.)
H. P. FAIRFIELD.
ORE SEPARATOR.
No. 292,638.   Patented Jan. 29. 1884.
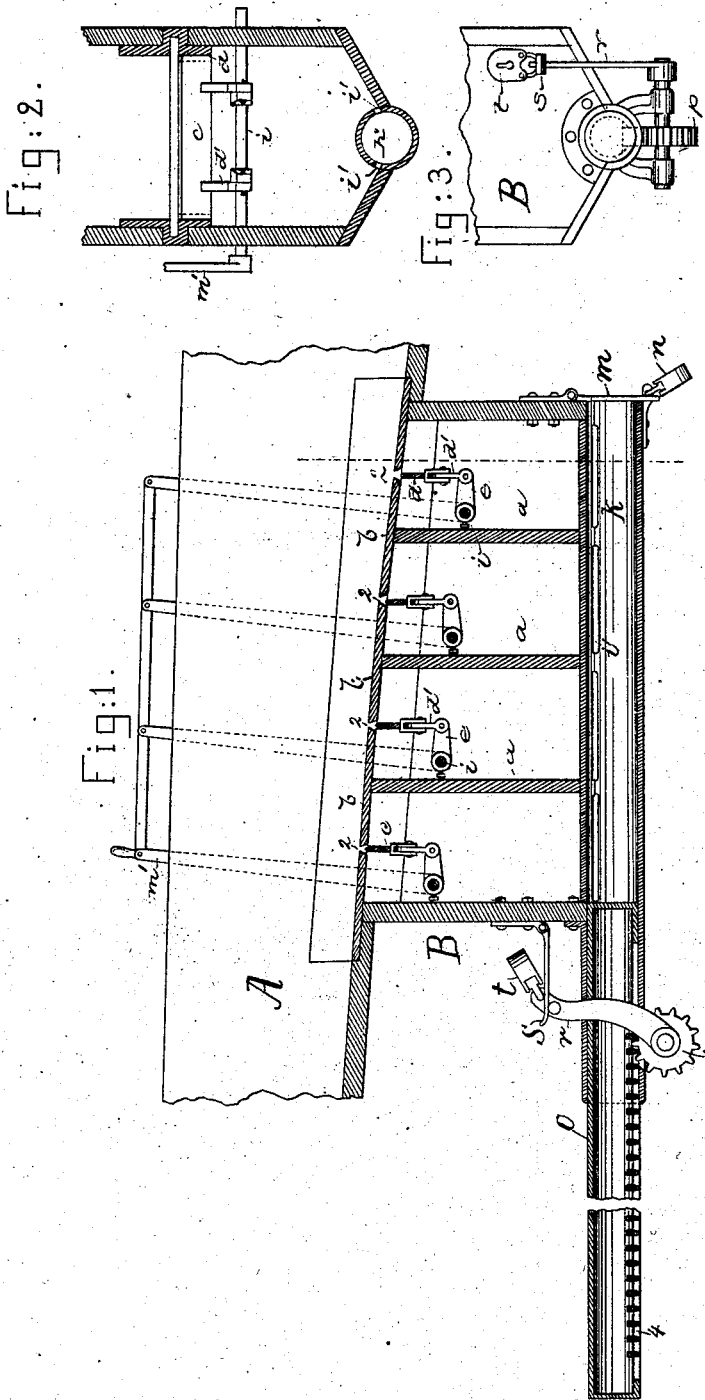
Witnesses.
Fred A. Powell
John F. C. Treinkert
Inventor.
Hadley P. Fairfield
by Crosby & Gregory attys.

UNITED STATES PATENT OFFICE.

HADLEY P. FAIRFIELD, OF WEST MEDFORD, MASSACHUSETTS.

ORE-SEPARATOR.

SPECIFICATION forming part of Letters Patent No. 292,638, dated January 29, 1884.

Application filed May 22, 1883. (No model.)

*To all whom it may concern:*

Be it known that I, HADLEY P. FAIRFIELD, of West Medford, county of Middlesex, State of Massachusetts, have invented an Improvement in Ore-Separators, of which the following description, in connection with the accompanying drawings, is a specification, like letters on the drawings representing like parts.

My invention relates to an ore-separator of that class in which the materials are acted upon by a stream flowing through a sluice and over narrow transverse slits in the bottom thereof.

In another application for Letters Patent made by me jointly with L. A. Shead, filed May 10, 1883, No. 94,521, an apparatus is shown consisting, essentially, of a portion of a sluice having its bottom made of a series of independent movable pieces having narrow slits between them of varied widths, and having below a receptacle for the material passing through the said slits. As there shown, the said receptacle was provided with an overflow, and did not stand full of water up to the slits in the bottom of the sluice, so that the water and other material passing through the said slits has some fall before reaching the still water in the receptacle. It is sometimes desirable to keep the receptacle practically full of water, so as to constitute a water-bottom to the said slits, so that there will be practically no flow of water through them.

The invention consists in the combinations of the various parts, as hereinafter to be more fully specified and claimed.

In the accompanying drawings, Figure 1 is a longitudinal section of a portion of an ore-separating apparatus embodying this invention; Fig. 2, a transverse section, and Fig. 3 an end elevation of a portion thereof.

The sluice A, of any suitable or usual construction, has a portion of its bottom provided with a series of transverse slits, 2, they preferably varying in width from an exceedingly narrow slit to one of from one-sixteenth to one-eighth of an inch in width, as described in the said joint application, and the bottom preferably having an increased inclination to the horizontal in the portion having the wider slits.

Beneath the portion of the sluice having the slitted bottom is a receptacle, B, having a series of partitions, $a$, constituting a series of independent chambers, one underneath each slit, the receptacle B being practically water-tight, and normally standing full of water while the apparatus is in operation.

In order to keep the slits 2 clear or to remove particles that may have become lodged therein, the bottom pieces, $b$, might be made movable or mounted to oscillate, as described in the said joint application. In this instance, however, the bottom plates are stationary, and a novel form of clearing device is employed, consisting of a thin plate or bar, $c$, held in guides $d$, through which they may be moved upward into the slit to thus raise the particles that may have lodged in the slit, and push them back the same way that they entered, so as not to crush or grind the particles, and thus wear the edges of the bottom plates, $b$.

As herein shown, the clearing devices $c$ are connected by links $d'$ with cranks $e$ upon rock-shafts $i$, extending out through the side of the sluice, and provided with arms $m'$, which may be operated by hand, or may be operated automatically by mechanism such as employed in the joint application hereinbefore referred to for oscillating the movable bottom plates.

In another joint application by the said Shead and myself, filed May 19, 1883, No. 95,771, a clearing device is shown operated from below the slit by mechanism wholly outside of the stream in the sluice, and I do not in this application broadly claim such an arrangement of the mechanism.

The bottom of the receiving-chamber B is inclined, as shown in Fig. 2, to direct the material into the tubular discharging-passage $k$, the said material entering through suitable slots or perforations, $i'$. The said discharge-passage $k$ is provided with a tight door or cover, $m$, having a suitable lock, $n$, and the said passage is emptied by means of an ejector, consisting of a hollow plunger, $o$, slotted at its under side, as shown at 4, and provided with rack-teeth adapted to be engaged by a pinion, $p$, operated by a crank, $r$, which crank is secured by a hasp, S, and lock $t$, to prevent it from being operated by unauthorized persons.

I claim—

1. In an ore-separator, the sluice having narrow transverse slits in its bottom and a substantially water-tight tank or receptacle beneath the said slits, adapted to remain full of water, combined with clearing devices consisting of plates or bars vertically movable into said slits, and supports for said plates or bars, which, together with their supports, are arranged wholly below the said slits, substantially as described.

2. A sluice having a transverse slit through its bottom, combined with a clearing device consisting of a plate or bar and means to move it into the said slit, substantially as described.

3. The sluice having a transversely-slotted bottom, combined with a clearing plate or bar movable in guides beneath each slit, and actuating mechanism therefor, whereby the said bar is movable upward into the said slit to lift particles therefrom and force them out in the direction from which they entered, as and for the purpose described.

4. The sluice and receiving-chamber beneath it, having a discharge-passage, combined with the ejecting-plunger and actuating mechanism therefor, whereby it may be forced longitudinally through the said passage to eject the contents thereof, substantially as described.

In testimony whereof I have signed my name to this specification in the presence of two subscribing witnesses.

HADLEY P. FAIRFIELD.

Witnesses:
 JOS. P. LIVERMORE,
 W. H. SIGSTON.